US008295795B2

(12) United States Patent
Goriaux et al.

(10) Patent No.: US 8,295,795 B2
(45) Date of Patent: Oct. 23, 2012

(54) METHOD AND DEVICE FOR OBTAINING AT LEAST ONE CALIBRATION FREQUENCY FOR CALIBRATING A TRANSMISSION CHAIN

(75) Inventors: Jacques Goriaux, Versailles (FR); Alain Bironneau, La Varenne (FR); François Raymond, Verdun sur Garonne (FR)

(73) Assignee: Sierra Wireless, Issy les Moulineaux (FR)

( * ) Notice: Subject to any disclaimer, the term of this patent is extended or adjusted under 35 U.S.C. 154(b) by 53 days.

(21) Appl. No.: 12/865,319

(22) PCT Filed: Jan. 16, 2009

(86) PCT No.: PCT/EP2009/050479
§ 371 (c)(1),
(2), (4) Date: Jan. 26, 2011

(87) PCT Pub. No.: WO2009/095320
PCT Pub. Date: Aug. 6, 2009

(65) Prior Publication Data
US 2011/0176625 A1 Jul. 21, 2011

(30) Foreign Application Priority Data
Jan. 30, 2008 (FR) .................................... 08 50560

(51) Int. Cl.
*H04B 1/04* (2006.01)
(52) U.S. Cl. ........................................ 455/127.1; 455/91
(58) Field of Classification Search ............ 455/91–129; 375/295–315; 370/289, 330
See application file for complete search history.

(56) References Cited

U.S. PATENT DOCUMENTS

| 5,285,470 | A | * | 2/1994 | Schreiber | ..................... 375/295 |
| 5,587,998 | A | * | 12/1996 | Velardo et al. | ................ 370/289 |
| 5,815,525 | A | * | 9/1998 | Smith et al. | ..................... 455/91 |
| 6,304,139 | B1 | * | 10/2001 | Kanno | ........................ 455/127.2 |
| 7,965,761 | B2 | * | 6/2011 | Shattil | ........................... 455/101 |
| 2009/0219800 | A1 | * | 9/2009 | Bocquet | ........................ 375/296 |
| 2009/0262700 | A1 | * | 10/2009 | Franceschini et al. | ........ 370/330 |

FOREIGN PATENT DOCUMENTS

| EP | 1389837 A1 | 2/2004 |
| WO | 0167621 A2 | 9/2001 |

OTHER PUBLICATIONS

French Search Report dated Sep. 16, 2008 for corresponding French Application No. 0850560, filed Jan. 30, 2008.
International Search Report dated Apr. 21, 2009 for corresponding International Application No. PCT/EP2009/050479, filed Jan. 16, 2009.
International Preliminary Report on Patentability and Written Opinion dated Sep. 14, 2010 for corresponding International Application No. PCT/EP2009/050479, filed Jan. 16, 2009.

\* cited by examiner

*Primary Examiner* — Lana N Le
(74) *Attorney, Agent, or Firm* — David D. Brush; Westman, Champlin & Kelly, P.A.

(57) ABSTRACT

A method is provided for obtaining a calibration frequency for calibrating a transmission chain that can transmit information signals on a frequency band comprising a plurality of channels. The chain includes an amplifier that can be configured according to at least one gain configuration. The method includes: obtaining an output power value of the amplifier; obtaining a frequency dispersion, based on the power value; detecting whether a constraint linked to said frequency dispersion is satisfied; and if the constraint is not satisfied, then obtaining a current frequency subband and a calibration frequency for said current frequency subband.

14 Claims, 2 Drawing Sheets

METHOD AND DEVICE FOR OBTAINING AT LEAST ONE CALIBRATION FREQUENCY FOR CALIBRATING A TRANSMISSION CHAIN

CROSS-REFERENCE TO RELATED APPLICATIONS

This application is a Section 371 National Stage Application of International Application No. PCT/EP2009/050479, filed Jan. 16, 2009 and published as WO 2009/095320 Aug. 6, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radiocommunication networks, and more particularly that of transmission chains in such networks.

The disclosure relates more precisely to the obtaining of calibration frequencies for calibrating such transmission chains comprising an amplifier that can have one or several gain configurations.

Calibration frequency (also called calibration channel in what follows), here means a frequency at which a calibration is going to be carried out.

BACKGROUND OF THE DISCLOSURE

As explained in the article "Base stations for mobile telephony (UMTS-FDD) recommendation on the measures", project of 17 Sep. 2003, published on the Internet website www.environnement-suisse.ch/electrosmog, UMTS technology (for "Universal Mobile Communication System") is a third generation mobile telephone technology. Each telecommunication operator operates its own UMTS network.

UMTS radiocommunication systems make it possible to transmit data at rates that are clearly higher than radiocommunication systems compliant with the GSM standard (for "Global System for Mobile"). They are thus indicated not only for vocal traffic but also for the transmission of images or digital videos.

In a radiocommunication system, each radiocommunications terminal comprises a transmission chain in order to be able to emit information in the radiocommunication network wherein it is provided to operate.

In relation with FIG. 1, a simplified diagram is shown of a conventional transmission chain 100 comprising a power amplifier 103.

More precisely, the transmission chain 100 comprises an analogue/digital convertor 101 (hereinafter designated by ADC 101) which transmits a control signal to an emitter 102. The emitter 102 generates an information signal (carrying the information to be emitted in the network) and transmits it to the power amplifier 103 so that the latter amplifies, before emission in the network via an antenna (not shown), the information signal. An output 104 of the power amplifier 103 is connected to a calibration point 105 which makes it possible to measure the output power of the power amplifier 103 during the calibration of the chain 100.

Concerning the control of the power of the amplifier 103 of the transmission chain 100, the GSM standard is much less restrictive than the UMTS standard. Indeed, for example, according to the GSM900 standard, the power servoing must take place in steps of 2 dB with a precision that ranges from +/−2 dB to +/−5 dB according to the power level between each step and this for an output power ranging between 33 dBm and 5 dBm while, according to the UMTS standard, the power servoing must take place in steps of 1 dB with a precision of +/−0.5 dB between each step and this for an output power ranging, for example, between +21 dBm and −50 dBm.

The architecture of the transmission chains compliant with the GSM standard is such that the frequency dispersion for a given power level is low. Indeed, these transmission chains do not include any band filter and the power amplifier 103 is conventionally a non-linear power amplifier which operates in compressed mode. In this case, in order to carry out the calibration it is sufficient to carry out a calibration at the central frequency and to apply it to all of the other frequencies of the band used.

Among the transmission chains compliant with the UMTS standard (hereinafter called UMTS transmission chains), first UMTS transmission chains use a fixed gain amplifier. These amplifiers are more linear than the amplifiers of GSM transmission chains as they are specifically polarised for this unique gain. It is therefore possible to calibrate such transmission chains over few frequencies and thus comply with the UMTS standard.

However, in order to reduce the energy consumption, second transmission chains are proposed that are compliant with the UMTS standard. These second transmission chains use a double gain amplifier which can be configured in such a way as to have a low gain or a high gain.

The calibration of these second transmission chains is complex due to the constraints imposed by the UMTS standard in particular in terms of precision on the step of the power servo of the transmission chain and due to the fact that the amplifier is a double gain amplifier.

The application of conventional calibration techniques of the first UMTS chains to these second UMTS chains does not procure sufficient precision (at frequencies other than those at which the calibration was carried out) in particular during the switching from the low gain configuration to the high gain configuration (or inversely) of the amplifier. Moreover, these conventional techniques are not very robust faced with the frequency dispersion of the transmission chain and are expensive, in particular in terms of memory (indeed, these conventional techniques imply the storage of a substantial amount of data).

SUMMARY

A particular embodiment of the invention relates to a method for obtaining at least one calibration frequency for calibrating a transmission chain that can transmit information signals on a frequency band comprising a plurality of channels, said chain comprising means for generating a control signal, means for emitting information signals controlled by said control signal and an amplifier of said information signals, said amplifier able to be configured according to at least one gain configuration.

According to an embodiment of the invention, the method comprises the following steps:
a) for each channel and each gain configuration, obtaining of an output power value of the amplifier;

b) obtaining of at least one frequency dispersion, on the basis of said power values;
c) for each frequency dispersion obtained, detection making it possible to detect whether a constraint linked to said frequency dispersion is satisfied;
if at least one constraint is not satisfied, then the following steps are carried out:
d) obtaining of a current frequency subband;
e) obtaining of a calibration frequency for said current frequency subband.

An embodiment of the invention therefore proposes to condition the obtaining of a calibration frequency by the detection that a constraint linked to a frequency dispersion is satisfied.

A particular embodiment makes it possible to analyse several constraints in parallel. Thus, a calibration frequency is obtained when one or several of these constraints are not satisfied.

In an example embodiment, the constraints are separate.

In a particular embodiment, the step c) of detecting consists, for example, in verifying that a frequency dispersion is strictly greater than a predetermined threshold. If the frequency dispersion is strictly greater than the threshold, then it is assumed that the constraint is satisfied, otherwise it is assumed that it is not satisfied.

Advantageously, the method comprises the following steps:
i) selecting a current channel from among said plurality of channels;
ii) for said current channel, implementing of the step b) of obtaining at least one frequency dispersion;
iii) for said current channel, implementing of the step c) of detecting;
    if at least one constraint is not satisfied, then the steps d) and e) of obtaining a current frequency subband and a calibration frequency are carried out;
iv) selecting a following channel from among said plurality of channels, said following channel becoming the current channel before returning to the step ii).

An embodiment of the invention makes it possible to define in a frequency band several subbands, and for each of these subbands to obtain a calibration frequency. Thus, for a given frequency band the number of calibration frequencies is optimised. An embodiment of the invention therefore makes it possible to provide a technique of obtaining calibration frequencies which is less expensive in terms of memory than the conventional techniques and which reduced the calibration times of the transmission chain.

Preferentially, the method comprises the following steps:
searching among the constraints which are not satisfied for the one which is the least best satisfied, called the worst case constraint, according to a determined comparison criterion;
obtaining of at least one selection variable, according to said worst case constraint.

An embodiment of the invention proposes to compare the unsatisfied constraints, in such a way as to determine the unsatisfied constraint whereon is the worst case.

Advantageously, said step d) of obtaining a current frequency subband comprises a step of determining an ending frequency for said current frequency subband.

Preferentially, said step of determining an ending frequency comprises the following steps:
obtaining, on the basis of a first expression chosen from among a first plurality of expressions according to said at least one selection variable, of a first calculation variable;

obtaining, on the basis of a first linear extrapolation, of at least one first coefficient;
calculating of said ending frequency, on the basis of said first calculation variable and of said at least one first coefficient.

Advantageously, said step e) of obtaining a calibration frequency comprises the following steps:
obtaining, on the basis of a second expression chosen from among a second plurality of expressions according to said at least one selection variable, of a second calculation variable;
obtaining of at least one calculation channel, by analysis of at least one constraint determined according to said at least one selection variable;
obtaining, on the basis of a first linear extrapolation and of said at least one calculation channel, of at least one second coefficient;
calculating of said calibration frequency, on the basis of said second calculation variable and of said at least one second coefficient.

Preferentially, the method further comprises the following steps, for a following frequency subband:
obtaining of a starting frequency;
obtaining of at least one output power value of the amplifier associated to said starting frequency.

Advantageously, the step b) comprises a step of obtaining of at least one first frequency dispersion equal to the difference between the output power value associated to said current channel and the output power value associated to said following channel.

In a particular embodiment, two first frequency dispersions are obtained, of which one is obtained based on the maximum output power value associated to the current channel and the other based on the minimum output power value associated to the current channel.

Preferentially, the amplifier is a double gain power amplifier, able to be configured according to first and second gain configurations.

Advantageously, the step b) comprises a step of obtaining of at least one second frequency dispersion equal to the difference between:
a first power difference equal to the difference between:
a first output power value associated to said first gain configuration and to said current channel; and
a second output power value associated to said second gain configuration and to said current channel; and
a second power difference equal to the difference between:
a third output power value associated to said first gain configuration and to said following channel; and
a fourth output power value associated to said second gain configuration and to said following channel.

In a particular embodiment, two second frequency dispersions are obtained, of which one is obtained based on a first maximum power difference ((HG-LG)max) and the other based on a first minimum power difference ((HG-LG)min).

According to an embodiment of the invention, said transmission chain of information signals is a chain compliant with the UMTS standard.

An embodiment of the invention also relates to a computer programme product which can be downloaded from a communication network and/or recorded on a support that can be read by a computer and/or that can be executed by a processor, said computer programme product comprising programme code instructions for the execution of the steps of the method of obtaining a calibration frequency such as previously described, when said programme is executed on a computer.

An embodiment of the invention further relates to a means of storage, possibly totally or partially removable, that can be read by a computer, storing a set of instructions that can be executed by said computer in order to implement the method of obtaining a calibration frequency such as previously described.

Another embodiment relates to a device for obtaining at least one calibration frequency for calibrating a transmission chain that can transmit information signals on a frequency band comprising a plurality of channels, said chain comprising means of generating a control signal, means of emitting information signals controlled by said control signal and an amplifier of said information signals, said amplifier able to be configured according to at least one gain configuration. According to an embodiment of the invention, the device comprises:

- means for obtaining at least one output power value of the amplifier;
- means for obtaining at least one frequency dispersion, based on the power value(s);
- means for detecting making it possible to detect whether at least one constraint linked to the frequency dispersion(s) is satisfied;
- means for obtaining a current frequency subband;
- means for obtaining a calibration frequency for said current frequency subband.

The advantages of the computer programme product, means of storage and the device for calibration are the same as those of the aforementioned method of obtaining calibration frequency, no further details are provided.

BRIEF DESCRIPTION OF THE DRAWINGS

Other characteristics and advantages shall appear more clearly when reading the following description of a preferred embodiment, provided as a simple and non-restricted example, and the annexed drawings, among which.

DETAILED DESCRIPTION OF ILLUSTRATIVE EMBODIMENTS

1. UMTS Transmission Chain Example

With a concern for simplifying the description, it shall be limited, in the rest of this document to describe the particular case where the transmission chain is a UMTS transmission chain comprising a double gain power amplifier. Those skilled in the art will extend without difficulty this teaching to any other type of transmission chain comprising a power amplifier with N gain, with $N \leq 1$.

Figure 1:
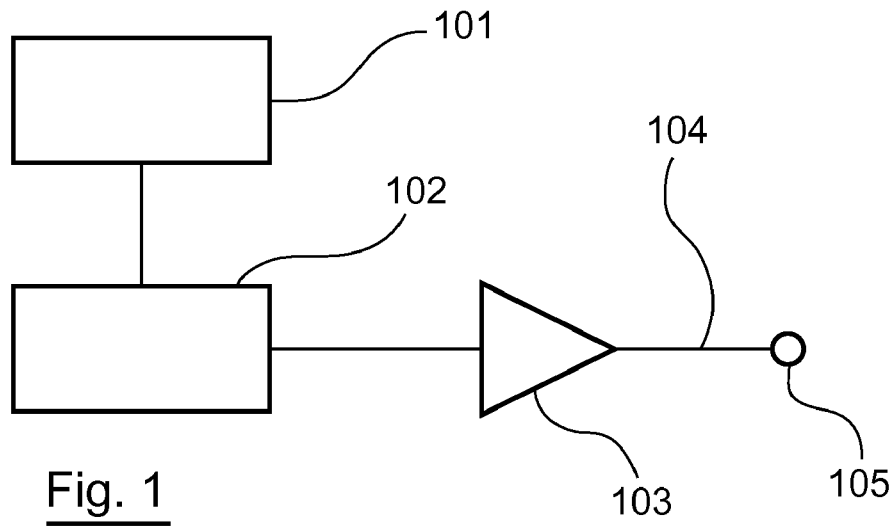
FIG. 1 shows a simplified diagram of a conventional transmission chain comprising a power amplifier.
Figure 2:
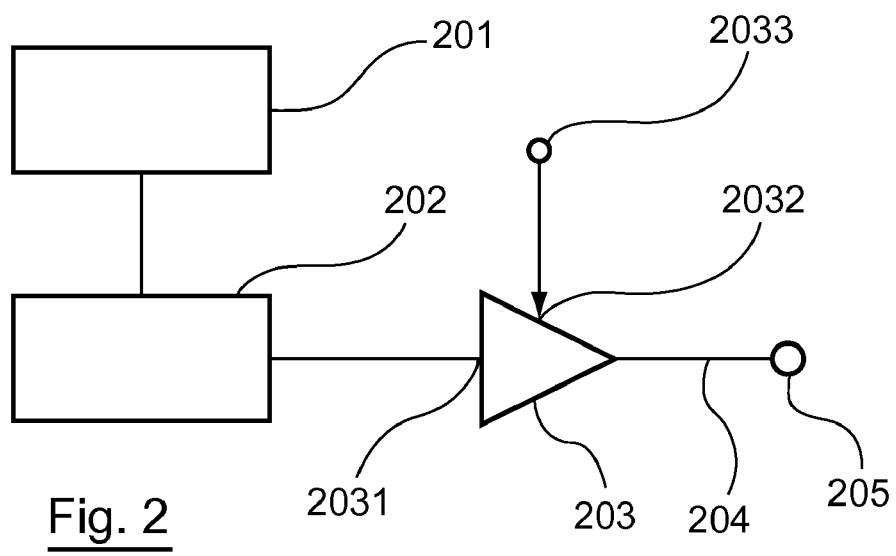
FIG. 2 shows a simplified diagram of an UMTS transmission chain comprising a double gain power amplifier for which can be implemented the method of obtaining calibration frequencies according to a particular embodiment of the invention.

In relation with FIG. 2, a simplified diagram of a UMTS transmission chain 200 is shown comprising a double gain power amplifier for which can be implemented the method of obtaining calibration frequencies according to a particular embodiment of the invention.

The transmission chain 200 comprises an analogue/digital convertor 201 (hereinafter designated by ADC 201) which transmits a control signal to an emitter 202, it thus controls the output power level of the emitter 202. The emitter 202 generates an information signal (carrying the information to be emitted in the network) and transmits it to a first input 2031 of the power amplifier 203 so that the latter amplifies, before emission in the network via an antenna (not shown), the information signal. An output 204 of the power amplifier 203 is connected to a calibration point 205 which makes it possible to measure the output power of the power amplifier 203 during the implementation of the method of obtaining calibration frequencies according to an embodiment of the invention hereinafter described in relation with FIG. 3.

Furthermore, due to the fact that the amplifier is a double gain amplifier (can be configured in low gain configuration or in high gain configuration), a control signal 2033, which is a logical signal, is applied to a second input 2032 of the amplifier 203 and makes it possible to select the high or low gain configuration of the amplifier 203. The low gain and high gain configurations are linked to the output power level which is delivered at the output of the power amplifier 203. For example, pour an output power less than 5 dBm, the amplifier 203 is configured in low gain (it has a first gain value which is the low gain) while for an output power greater than 5 dBm, it is configured in high gain (it has a second gain value which is the high gain). This borderline value of the output power can of course change, in such a way as to optimise the efficiency of the transmission chain 200.

Figure 3:
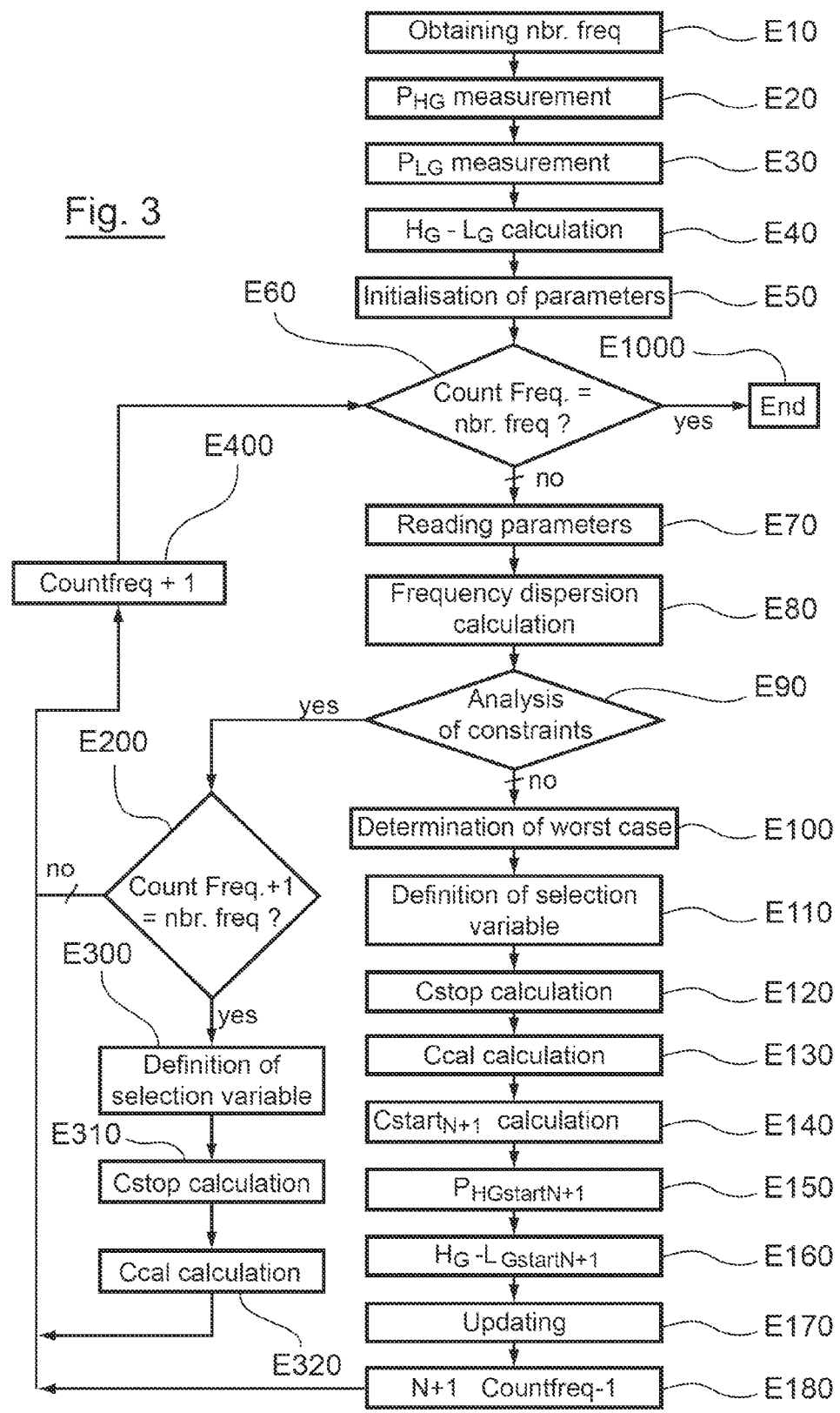
FIG. 3 shows the main steps of a method of obtaining calibration frequencies for the calibration of the transmission chain in FIG. 2 according to a particular embodiment of the invention.

In relation with FIG. 3, the main steps of a method of obtaining calibration frequencies for calibrating the transmission chain 200 in FIG. 2 are shown according to a particular embodiment of the invention. For example, the method of obtaining calibration frequencies according to a particular embodiment of the invention is implemented by a device for obtaining calibration frequencies hereinafter described in relation with FIG. 4.

Recall that the transmission chain can transmit information signals on a frequency band comprising a plurality of channels.

As shall be seen hereinafter, the method according to a particular embodiment of the invention makes it possible to obtain, for a given frequency band, one or several frequency subbands each characterised by a starting channel (Cstart), an ending channel (Cstop) and a calibration channel (Ccal) (also called calibration frequency).

During a first step E10, a number "nbr_freq" of channels representative of the frequency variation of the output power of the amplifier over the frequency band is defined (or is obtained from a user via a graphic interface or from a memory).

In the non-restrictive example provided in annex 1, 13 channels (nbr_freq=13) are defined among which the channel referenced as C9750 corresponds to the central frequency and the 12 channels referenced as C9612, C9637, C9662, C9687, C9712, C9737, C9762, C9787, C9812, C9837, C9862 and C9888 are separated from one another by approximately 5 MHz.

During a step E20, for each of the channels defined in step E10, an output power value $P_{HG}$ of the amplifier 203 in high gain configuration (also called high power value in what follows) on the calibration point 205, is obtained through measurement. Note that during this step E20, the amplifier 203 is configured in high gain by means of the control signal 2033 which is, for example, at logic state "1", and the ADC 201 is controlled in such a way that it generates a first value $C_{HG}$ of control signal.

In the example in annex 1, for the channel C9612 an output power of the amplifier of 4.59 dBm is measured.

During a step E30, for each of the channels defined in step E10, an output power value $P_{LG}$ of the amplifier 203 in low gain configuration (also called low power value in what follows) on the calibration point 205, is obtained through measurement. Note that during this step E30, the amplifier 203 is configured in low gain by means of the control signal 2033 which is, for example, at logic state "0", and the ADC 201 is controlled in such a way that it generates a second value $C_{LG}$ of control signal.

In a particular embodiment, the high power $P_{HG}$ and low power $P_{LG}$ measurements can be taken with any type of device able to measure an electrical power (such as a power measurer, a UMTS dedicated tester, etc.).

Preferentially, the measured values of high power $P_{HG}$ and low power $P_{LG}$ are collected in a memory 41 of the device for obtaining calibration frequencies hereinafter described in relation with FIG. 4.

During a step E40, for each of the channels defined in step E10, a power difference HG-LG is calculated equal to the difference between the high power value $P_{HG}$ and low power value $P_{LG}$ measured in steps E20 and E30.

In the example in annex 1, for the channel C9612 a power difference of −0.99 dB is obtained.

During a step E50, the following parameters are initialized: the parameter N corresponds to the number of the frequency subband studied. At the start, N=1;
the parameter Cstart corresponds to the starting channel of the Nth frequency subband studied. At the start, the starting channel of the first (N=1) frequency subband studied is equal to the first channel defined in step E10. In the example in annexe 1, at the start, Cstart=C9612;

the parameter $P_{HG\text{-}cstart}$ corresponds to the high power of the amplifier for the starting channel Cstart. In the example in annex 1, at the start, $P_{HG\text{-}Cstart}$=4.59 dBm;

the parameter HG-LG$_{Cstart}$ corresponds to the power difference for the starting channel Cstart. In the example in annex 1, at the start, HG-LG$_{Cstart}$=−0.99 dB;

the parameter CountFreq corresponds to the value of a frequency counter. At the start, CountFreq=1. As shall be seen hereinafter, this parameter CountFreq is also used as a channel index $C_{CountFreq}$. For example, when CountFreq=4, this means that the channel involved is the fourth channel defined in step E10;

the parameter (HG-LG)min corresponds to a minimum value of power difference. At the start, (HG-LG) min=HG-LG$_{Cstart}$;

the parameter (HG-LG)max corresponds to a maximum value of power difference. At the start, (HG-LG) max=HG-LG$_{Cstart}$;

the parameter $P_{HG\ min}$ corresponds to a minimum value of high power. At the start, $P_{HG\ mm}$=$P_{HG\text{-}Cstart}$;

the parameter $P_{HG\ max}$ corresponds to a maximum value of high power. At the start, $P_{HG\ max}$=$P_{HG\text{-}Cstart}$.

Preferentially, the parameters described hereinabove are stored in the memory 41 of the device for obtaining calibration frequencies (cf. FIG. 4).

During a step E60, it is checked whether or not the parameter CountFreq is equal to the number nbr_freq defined in step E10. If the parameter CountFreq is equal to the number nbr_freq, then control is passed to a step E1000 which marks the end of the method, otherwise control is passed to a step E70.

During the step E70, it is proceeded to the reading of the parameters (HG-LG)min, (HG-LG)max, $P_{HGmin}$ and $P_{HG\ max}$ which are, for example, stored in the memory 41 of the device for obtaining calibration frequencies.

During a step E80, the first $\Delta P_{HG\ min}$ and $\Delta P_{HG\ max}$ and seconds Δ(HG-LG)min and Δ(HG-LG)max frequency dispersions are calculated by means of the following expressions:

$$\Delta P_{HG\ min}=P_{HG\ min}-P_{HG\ CountFreq+1};$$

$$\Delta P_{HG\ max}=P_{HG\ max}-P_{HG\ CountFreq+1};$$

$$\Delta(HG\text{-}LG)\text{min}=(HG\text{-}LG)\text{min}-(HG\text{-}LG)_{CountFreq+1};$$

$$\Delta(HG\text{-}LG)\text{max}=(HG\text{-}LG)\text{max}-(HG\text{-}LG)_{CountFreq+1};$$

where
$P_{HG\ min}$ is the minimum value of high power obtained in the step E70;
$P_{HG\ max}$ is the maximum value of high power obtained in the step E70;
$P_{HG\ CountFreq+1}$ is the measured high power value for the channel $C_{CountFreq+1}$ (also called following channel);
(HG-LG)min is the minimum value of power difference obtained in the step E70;
(HG-LG)max is the maximum value of power difference obtained in the step E70; and
(HG-LG)$_{CountFreq+1}$ is the calculated power difference for the channel $C_{CountFreq+1}$. Recall that the 3GPP standard impose the following two constraints:
The difference in level between two consecutive powers (for a given frequency) must be 1±0.5 dB; and
the dispersion of the maximum output power must be +1/−3 dB around +24 dBm.

Thus, in order to guarantee the 3GPP standard the first and second frequency dispersions (calculated in step E80) must comply with the following constraints:

$$\Delta P_{HG\ min}>-C_P; \qquad\qquad \text{a)}$$

$$\Delta P_{HG\ max}<+C_P; \qquad\qquad \text{b)}$$

$$\Delta(HG\text{-}LG)\text{min}>-C_\Delta; \qquad\qquad \text{c)}$$

$$\Delta(HG\text{-}LG)\text{max}<+C_\Delta. \qquad\qquad \text{d)}$$

In the example in annex 1, the setpoint $C_P$ is set to 1 dB and the setpoint $C_A$ to 0.5 dB.

During a step E90, the four constraints a), b), c) and d) defined hereinabove are analysed. If at least one of these constraints is not respected then a calibration to be carried out is detected and step E100 is performed. On the other hand, if all of the constraints are respected then no calibration is to be carried out and step E200 is performed.

During the step E100, it is determined from among the constraints that are not respected (determined in step E90) the one that is the least best respected (called the worst case constraint hereinafter). Thus, a comparison is made between the constraints that are not respected. It is important to note that this comparison must be done in a homogeneous manner since certain constraints are expressed in dB and others in dBm. It is therefore necessary to standardise one in relation to the other.

During a step E110, two selection variables are defined. The first variable "CONSTRAINT" indicates which of the parameters $P_{HG}$ or HG-LG caused the worst case constraint (determined in step E100), and the second variable "VALUE" specifies if it is the minimum value (min) or maximum value (max) of the first variable CONSTRAINT that caused the worst case constraint (determined in step E100). Thus:
- if the constraint a) is the worst case constraint, then CONSTRAINT=$P_{HG}$ and VALUE=min;
- if the constraint b) is the worst case constraint, then CONSTRAINT=$P_{HG}$ and VALUE=max;
- if the constraint c) is the worst case constraint, then CONSTRAINT=(HG-LG) and VALUE=min;
- if the constraint d) is the worst case constraint, then CONSTRAINT=(HG-LG) and VALUE=max.

During a step E120, the ending channel $Cstop_N$ of the Nth frequency subband studied is determined. In this step E120, note that the index channel CountFreq+1 is not the last channel of the channels defined in the step E10. Therefore, the ending channel $Cstop_N$ is located between the two last channels studied:

$$C_{countFreq} < Cstop_N < C_{CountFreq+1}$$

In a particular embodiment, in order to determine the ending channel $Cstop_N$ a linear extrapolation is carried out. Thus, the directional coefficient "a" and the ordinate at the origin "b" are determined from the following expression:

$$y = a^*x + b$$

where
the variable "x" corresponds to a channel; and
the variable "y" corresponds to the measured high power ($P_{HG}$) or to the calculated power difference (HG-LG) for this channel. The choice between the high power and the power difference is according to the variable CONSTRAINT determined in the step E110. More precisely:
- if CONSTRAINT=$P_{HG}$, then "y" shows a high power;
- if CONSTRAINT=(HG-LG), then "y" shows a power difference.

Within the framework of this linear extrapolation, the coefficients a and b are obtained by means of the following expressions:

if CONSTRAINT=$P_{HG}$, then:

$$a = (P_{HG\ CountFreq+1} - P_{HG\ CountFreq})/(C_{CountFreq+1} - C_{CountFreq});$$

$$b = P_{HG\ CountFreq} - a^* C_{CountFreq};$$

if CONSTRAINT=(HG-LG), then:

$$a = ((HG\text{-}LG)_{CountFreq+1} - (HG\text{-}LG)_{CountFreq})/(C_{CountFreq+1} - C_{CountFreq});$$

$$b = (HG\text{-}LG)_{CountFreq} - a^* C_{CountFreq}.$$

Then, a variable $CONSTRAINT_{Cstop}$ is calculated by means of an expression chosen according to the variables CONSTRAINT and VALUE (determined in the step E110). More precisely:
- if CONSTRAINT=$P_{HG}$ and VALUE=min, then: $CONSTRAINT_{Cstop} = P_{HG\ CstopN} = P_{HG\ min} + C_P$;
- if CONSTRAINT=$P_{HG}$ and VALUE=max, then: $CONSTRAINT_{Cstop} = P_{HG\ CstopN} = P_{HG\ max} - C_P$;
- if CONSTRAINT=(HG-LG) and VALUE=min, then: $CONSTRAINT_{Cstop} = (HG\text{-}LG)_{CstopN} = (HG\text{-}LG)\min + C_\Delta$;
- if CONSTRAINT=(HG-LG) and VALUE=max, then: $CONSTRAINT_{Cstop} = (HG\text{-}LG)_{CstopN} = (HG\text{-}LG)\max - C_\Delta$.

Finally, the ending channel $Cstop_N$ of the Nth frequency subband studied is calculated by means of the following expression:

$$Cstop_N = \text{ROUNDED}[(CONSTRAINT_{Cstop} - b)/a].$$

During a step E130, the calibration channel $Ccal_N$ of the Nth frequency subband studied is determined.

In a first step, a variable $CONSTRAINT_{Ccal}$ is calculated by means of an expression chosen according to the variables CONSTRAINT and VALUE (determined in the step E110). More precisely:
- if CONSTRAINT=$P_{HG}$ and VALUE=min, then: $CONSTRAINT_{Ccal} = P_{HG\ CcalN} = P_{HG\ min} + C_P/2$
- if CONSTRAINT=$P_{HG}$ and VALUE=max, then: $CONSTRAINT_{Ccal} = P_{HG\ CcalN} = P_{HG\ max} - C_P/2$;
- if CONSTRAINT=(HG-LG) and VALUE=min, then: $CONSTRAINT_{Ccal} = (HG\text{-}LG)_{CcalN} = (HG\text{-}LG)\min + C_\Delta/2$;
- if CONSTRAINT=(HG-LG) and VALUE=max, then: $CONSTRAINT_{Ccal} = (HG\text{-}LG)_{CcalN} = (HG\text{-}LG)\max - C_\Delta/2$.

Then, from among the channels defined in the step E10 the two consecutive channels $C_i$ and $C_{i-1}$ are determined which make it possible to satisfy the following constraints:
- if CONSTRAINT=$P_{HG}$, then the constraints to be satisfied are:

$$P_{HG\ Ci-1} < P_{HG\ Ccal} < P_{HG\ Ci};\ \text{or}$$

$$P_{HG\ Ci-1} > P_{HG\ Ccal} > P_{HG\ Ci}$$

- if CONSTRAINT=(HG-LG), then the constraints to be satisfied are:

$$(HG\text{-}LG)_{Ci-1} < (HG\text{-}LG)_{Ccal} < (HG\text{-}LG)_{Ci};\ \text{or}$$

$$(HG\text{-}LG)_{Ci-1} > (HG\text{-}LG)_{Ccal} > (HG\text{-}LG)_{Ci}$$

Then, a linear extrapolation is carried out in order to determine the directional coefficient "a" and the ordinate at the origin "b" for the following expression:

$$y = a^*x + b$$

where
the variable "x" corresponds to a channel; and
the variable "y" corresponds to the measured high power ($P_{HG}$) or to the calculated power difference (HG-LG) for this channel. The choice between the high power and the power difference is according to the variable CONSTRAINT determined in the step E110.

Within the framework of this linear extrapolation, the coefficients a and b are obtained by means of the following expressions:

if CONSTRAINT=$P_{HG}$, then:

$$a = (P_{HG\ Ci} - P_{HG\ Ci-1})/(C_i - C_{i-1});$$

$$b = P_{HG\ Ci} - a^* C_i;$$

if CONSTRAINT=(HG-LG), then:

$$a = ((HG\text{-}LG)_{Ci} - (HG\text{-}LG)_{Ci-1})/(C_i - C_{i-1});$$

$$b = (HG\text{-}LG)_{Ci} - a^* C_i;$$

Finally, the calibration channel $Ccal_N$ of the Nth frequency subband studied is calculated by means of the following expression:

$$Ccal_N = \text{ROUNDED}[(CONSTRAINT_{Ccal} - b)/a].$$

During a step E140, the starting channel $Cstart_{N+1}$ of the (N+1)th frequency subband is determined, in other words, the starting channel of the following subband is determined. In a particular embodiment, the starting channel of the following subband $Cstart_{N+1}$ follows the ending channel of the current subband $Cstop_N$. The starting channel $Cstart_{N+1}$ of the (N+1)

th frequency subband is therefore calculated by means of the following expression:

$$C_{start\,N+1} = C_{stop\,N} + 1.$$

During a step E150, the high power $P_{HG\text{-}Cstart\,N+1}$ is determined for the starting channel $Cstart_{N+1}$ obtained in the step E140.

In a first step, the two high powers are determined which make it possible to satisfy the following constraints:

$$P_{HG\,CCountFreq} < P_{HG\,Cstart\,N+1} < P_{HG\,CCountFreq+1}; \text{ or}$$

$$P_{HG\,CCountFreq} > P_{HG\,Cstart\,N+1} > P_{HG\,CCountFreq+1}.$$

Then, a linear extrapolation is carried out in order to determine the directional coefficient "a" and the ordinate at the origin "b" from the following expression:

$$y = a*x + b$$

where
the variable "x" corresponds to a channel; and
the variable "y" corresponds to the high power of this channel.

Within the framework of this linear extrapolation, the coefficients a and b are obtained by means of the following expressions:

$$a = (P_{HG\text{-}CCountFreq+1} - P_{HG\text{-}CCountFreq})/(C_{CountFreq+1} - C_{CountFreq});$$

$$b = P_{HG\text{-}CCountFreq} - a*C_{CountFreq}.$$

Finally, the high power $P_{HG\text{-}Cstart\,N+1}$ is calculated by means of the following expression:

$$P_{HG\text{-}Cstart\,N+1} = a*Cstart + b.$$

During a step E160, the power difference $(HG\text{-}LG)_{Cstart\,N+1}$ is determined for the starting channel $Cstart_{N+1}$ obtained in the step E140.

In a first step, the two power differences are determined which make it possible to satisfy the following constraints:

$$(HG\text{-}LG)_{CCountFreq} < (HG\text{-}LG)_{Cstart\,N+1} < (HG\text{-}LG)_{CCountFreq+1}; \text{or}$$

$$(HG\text{-}LG)_{CCountFreq} > (HG\text{-}LG)_{Cstart\,N+1} > (HG\text{-}LG)_{CCountFreq+1}.$$

Then, a linear extrapolation is carried out in order to determine the directional coefficient "a" and the ordinate at the origin "b" from the following expression:

$$y = a*x + b$$

where
the variable "x" corresponds to a channel; and
the variable "y" corresponds to the power difference of this channel.

Within the framework of this linear extrapolation, the coefficients a and b are obtained by means of the following expressions:

$$a = ((HG\text{-}LG)_{CCountFreq+1}(HG\text{-}LG)_{CCountFreq})/(C_{CountFreq+1}C_{CountFreq});$$

$$b = (HG\text{-}LG)_{CCountFreq} - a*C_{CountFreq};$$

Finally, the power difference $(HG\text{-}LG)_{Cstart\,N+1}$ is calculated by means of the following expression:

$$(HG\text{-}LG)_{Cstart\,N+1} = a*C_{start\,N+1} + b.$$

During a step E170, the following updates are carried out:
$C_{CountFreq} = C_{start\,N+1};$
$(HG\text{-}LG)_{CCountFreq} = (HG\text{-}LG)_{Cstart\,N+1};$
$P_{HG\,CCountFreq} = P_{HG\,Cstart\,N+1};$
$(HG\text{-}LG)\min = (HG\text{-}LG)\max = (HG\text{-}LG)_{Cstart\,N+1};$ and
$P_{HG\,min} = P_{HG\,max} = P_{HG\,Cstart\,N+1}.$ During a step E180, the parameter N is incremented by one unit, and the parameter CountFreq is decremented by one unit. Then, step E400 is performed.

During the step E200, it is checked whether or not the parameter CountFreq+1 is equal to the number nbr_freq defined in step E10. If the parameter CountFreq+1 is equal to the number nbr_freq, then a step E300, otherwise the step E400, is performed.

During the step E300, it is determined from among the constraints that are not complied with (determined in step E90) the one that is the least best respected (worst case constraint). Thus, a comparison is made between the constraints that are not complied with. It is important to note that this comparison must be done in a homogeneous manner since certain constraints are expressed in dB and others in dBm. It is therefore necessary to standardise one in relation to the other.

During a step E310, two selection variables are defined. The first variable "CONSTRAINT" indicates which of the parameters $P_{HG}$ or HG-LG caused the worst case constraint (determined in step E300), and the second variable "VALUE" specifies if it is the minimum value (min) or maximum value (max) of the first variable CONSTRAINT that caused the worst case constraint (determined in the step E300). Thus:
  if the constraint a) is the worst case constraint, then CONSTRAINT=$P_{HG}$ and VALUE=min;
  if the constraint b) is the worst case constraint, then CONSTRAINT=$P_{HG}$ and VALUE=max;
  if the constraint c) is the worst case constraint, then CONSTRAINT=(HG-LG) and VALUE=min;
  if the constraint d) is the worst case constraint, then CONSTRAINT=(HG-LG) and VALUE=max.

During a step E320, the ending channel $Cstop_N$ of the Nth frequency subband studied is determined. In this step E320, note that the index channel CountFreq+1 is the last channel of the channels defined in the step E10. Therefore, the ending channel $Cstop_N$ is equal to the channel $C_{CountFreq+1}$.

During a step E330, the calibration channel $Ccal_N$ of the Nth frequency subband studied is determined.

In a first temps, a variable $CONSTRAINT_{Ccal}$ is obtained by means of an expression chosen according to the variable CONSTRAINT (determined in the step E310). More precisely:
  if CONSTRAINT=$P_{HG}$, then:
    $CONSTRAINT_{Ccal} = P_{HG\,CcalN} = (P_{HG\,max} + P_{HG\,min})/2;$
  if CONSTRAINT=(HG-LG), then:
    $CONSTRAINT_{Ccal} = (HG\text{-}LG)_{CcalN} = ((HG\text{-}LG)\max + (HG\text{-}LG)\min)/2.$ Then, from among the channels defined in the step E10 the two consecutive channels $C_i$ and $C_{i-1}$ are determined which make it possible to satisfy the following constraints:
  if CONSTRAINT=$P_{HG}$, then the constraints to be satisfied are:

$$P_{HG\,Ci-1} < P_{HG\,Ccal} < P_{HG\,Ci}; \text{ or}$$

$$P_{HG\,Ci-1} > P_{HG\,Ccal} > P_{HG\,Ci}$$

if CONSTRAINT=(HG-LG), then the constraints to be satisfied are:

$$(HG\text{-}LG)_{Ci-1} < (HG\text{-}LG)_{Ccal} < (HG\text{-}LG)_{Ci}; \text{or}$$

$$(HG\text{-}LG)_{Ci-1} > (HG\text{-}LG)_{Ccal} > (HG\text{-}LG)_{Ci}$$

Then, a linear extrapolation is carried out in order to determine the directional coefficient "a" and the ordinate at the origin "b" for the following expression:

$$y = a^*x + b$$

where the variable "x" corresponds to a channel; and the variable "y" corresponds to the measured high power ($P_{HG}$) or to the calculated power difference (HG-LG) for this channel. The choice between the high power and the power difference is according to the variable CONSTRAINT determined in the step E110.

Within the framework of this linear extrapolation, the coefficients a and b are obtained by means of the following expressions:

if CONSTRAINT=$P_{HG}$, then:

$$a = (P_{HG\ Ci} - P_{HG\ Ci-1})/(C_i - C_{i-1});$$

$$b = P_{HG\ Ci} - a^*C_i;$$

if CONSTRAINT=(HG-LG), then:

$$a = ((HG-LG)_{Ci} - (HG-LG)_{Ci-1})/(C_i - C_{i-1});$$

$$b = (HG-LG)_{Ci} - a^*C_i;$$

Finally, the calibration channel $Ccal_N$ of the Nth frequency subband studied is calculated by means of the following expression:

$$Ccal_N = \text{ROUNDED}[(\text{CONSTRAINT}_{Ccal} - b)/a].$$

Then, control is passed to step E400.

During the step E400, the parameter CountFreq is incremented by one unit. Then, step E60 is performed.

Figure 4:
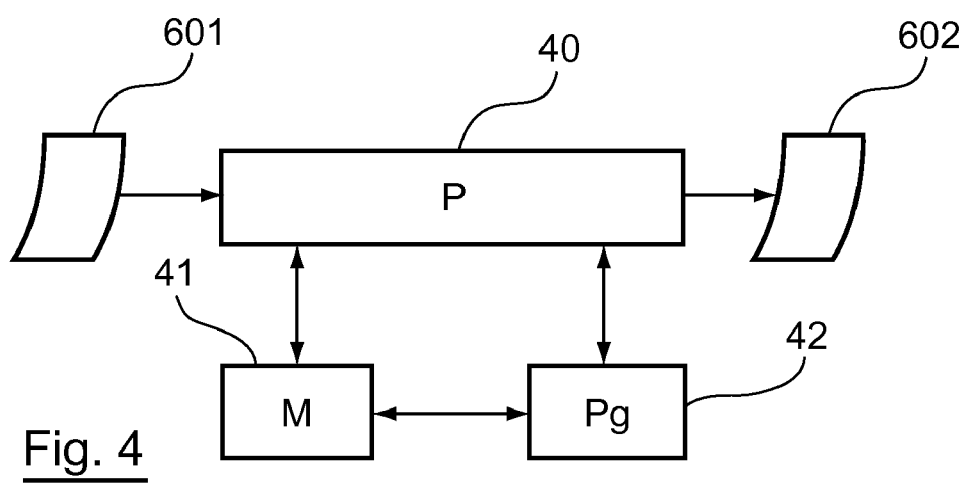
FIG. 4 shows a simplified diagram of a device for obtaining calibration frequencies in accordance with a particular embodiment of the invention.

FIG. 4 shows a simplified diagram of a device for obtaining calibration frequencies in accordance with a particular embodiment of the invention, which comprises a memory M 41 (for example a RAM memory), a processing unit P 40, provided for example with a microprocessor, and controlled by the computer programme (or application) Pg 42 implementing certain steps of the method according to an embodiment of the invention described in FIG. 3.

At initialization, the computer programme code instructions 42 are for example loaded into the RAM memory 41 before being executed by the microprocessor of the processing unit 40. The processing unit 40 obtains a listing of the frequency response of the transmission chain 200, i.e. the measured values of the output power of the amplifier in high gain configuration $P_{HG}$ and low gain configuration $P_{LG}$. The microprocessor of the processing unit 40 processes these measured values, according to the computer programme code instructions 42, and delivers as output the calibration frequencies $Ccal_N$ for which a calibration is to be carried out.

An embodiment of the disclosure provides a technique that makes it possible to rapidly and effectively obtain a calibration frequency for the calibration of a transmission chain comprising a power amplifier with at least one gain configuration.

An embodiment of the disclosure provides such a technique that is inexpensive, in particular in terms of memory.

An embodiment of the disclosure provides such a technique that improves the precision concerning the switching from the first gain configuration to the second gain configuration of the amplifier or inversely.

An embodiment of the disclosure provides such a technique that is robust faced with the frequency dispersions of the transmission chain.

An embodiment of the disclosure provides such a technique that is simple to implement and at a low cost.

2. Annex 1

Example of determining frequency subband and calibration frequencies 2.1. Measuring Powers and Initialization of Parameters The initial parameters are as follows.

.nbr_freq=13 and the channels used are the following:

.12 channels spaced approximately 5 MHz each: C9612, C9637, C9662, C9687, C9712, C9737, C9762, C9787, C9812, C9837, C9862, C9888

.1 channel which corresponds to the central frequency: C9750

Of course, in another example the number of channels and their distribution in the frequency band can change.

The results of the measurements allows us to complete the following initial table:

| | Channel | | | | | | | | | | | | |
|---|---|---|---|---|---|---|---|---|---|---|---|---|---|
| | 9612 | 9637 | 9662 | 9687 | 9712 | 9737 | 9750 | 9762 | 9787 | 9812 | 9837 | 9862 | 9888 |
| $P_{HG}$ | 4.59 | 4.73 | 4.96 | 5.13 | 5.16 | 5.14 | 5.2 | 5.05 | 4.81 | 4.37 | 4.05 | 3.85 | 3.74 |
| HG-LG | −0.99 | −1.01 | −0.77 | −0.32 | 0.19 | 0.53 | 0.7 | 0.74 | 0.79 | 0.67 | 0.66 | 0.62 | 0.64 |

The following parameters are initialized:

N=1

Cstart=C9612

$P_{HG-Cstart}$=4.59 dBm

HG-$LG_{Cstart}$=−0.99 dB

CountFreq=1

(HG-LG)min=(HG-LG)max=(HG-LG)$_{Cstart}$=(HG-LG)$_{C9612}$=−0.99 dB $P_{HG\ min}$=$P_{HG\ max}$=$P_{HG\ Cstart}$=$P_{HG-C9612}$=4.59 dBm 2.2. Determination of BW1 (First Frequency Band)

2.2.1.1 Last Channel Verification

[(CountFreq)=1]≠[nbr_freq=13], where:

2.2.1.2 Determination Parameters (HG-LG)min; (HG-LG)max; $P_{HG\ min}$ and $P_{HG\ max}$ We compare the values of $P_{HG}$ and (HG-LG) with the index of the channel C9637 in relation to the previous minimum and maximum values. Where:

(HG-LG)max=HG-$LG_{C9637}$=−0.99 dB (HG-LG)min=HG-$LG_{C9612}$=−1.01 dB $P_{HG\ max}$=$P_{HG-C9612}$=4.73 dBm $P_{HG\ min}$=$P_{HG-C9637}$=4.59 dBm 2.2.1.3 Verification of the Constraints The constraints test provides the following result:

$$\Delta(HG-LG)\max = (HG-LG)\max - (HG-LG)_{C9637} = -0.99 - (-1.01) = 0.02 <+C_\Delta$$

$$\Delta(HG-LG)\min = (HG-LG)\min - (HG-LG)_{C9637} = -0.99 - (-1.01) = 0.02 >-C_\Delta$$

$$\Delta P_{HG\ max} = P_{HG\ max} - P_{HG-C9637} = 4.59 - 4.73 = -0.14 <+C_P$$

$$\Delta P_{HG\ min} = P_{HG\ min} - P_{HG-C9637} = 4.59 - 4.73 = -0.14 >-C_P$$

Therefore, all of the constraints are held.

Yet:[(CountFreq+1)=2]≠[nbr_freq=13],where:CountFreq=2

2.2.2.1 Last Channel Verification

[(CountFreq)=2]≠[nbr_freq=13],where:

2.2.2.2 Determination Parameters (HG-LG)min; (HG-LG)max; $P_{HG\ min}$ and $P_{HG\ max}$ We compare the values of $P_{HG}$ and (HG-LG) with the index of the channel C9662 in relation to the previous minimum and maximum values. Where:
(HG-LG)max=−0.77 dB
(HG-LG)min=−1.01 dB
$P_{HG\ max}$=4.96 dBm
$P_{HG\ min}$=4.59 dBm

2.2.2.3 Verification of the Constraints

The constraints test provides the following result:

Δ(HG-LG)max=(HG-LG)max=(HG-LG)max−(HG-LG)$_{C9662}$=−0.99−(−0.77)=−0.22<+$C_Δ$

Δ(HG-LG)min=(HG-LG)min−(HG-LG)$_{C9662}$=−1.01−(−0.77)=−0.24>−$C_Δ$

Δ$P_{HG\ max}$=$P_{HG\ max}$−$P_{HG-C9662}$=4.73−4.96=−0.23<+$C_P$

Δ$P_{HG\ min}$=$P_{HG\ min}$−$P_{HG-C9662}$=4.59−4.96=−0.37>−$C_P$

Therefore, all of the constraints are held.

Yet:[(CountFreq+1)=3]≠[nbr_freq=13],where:CountFreq=3

2.2.3.1 Last Channel Verification

[(CountFreq)=3]≠[nbr_freq=13],where:

2.2.3.2 Determination Parameters (HG-LG)min; (HG-LG)max; $P_{HG\ min}$ and $P_{HG\ max}$ We compare the values of $P_{HG}$ and (HG-LG) with the index of the channel C9687 in relation to the previous minimum and maximum values. Where:
(HG-LG)max=−0.32 dB
(HG-LG)min=−1.01 dB
$P_{HG\ max}$=5.13 dBm
$P_{HG\ min}$=4.59 dBm

2.2.3.3 Verification of the Constraints

The constraints test provides the following result:

Δ(HG-LG)max=(HG-LG)max=(HG-LG)max−(HG-LG)$_{C9687}$=−0.77−(−0.32)=−0.45<+$C_Δ$

Δ(HG-LG)min=(HG-LG)min−(HG-LG)$_{C9687}$=−1.01−(−0.32)=−0.69<−$C_Δ$

Δ$P_{HG\ max}$=$P_{HG\ max}$−$P_{HG-C9698}$=4.96−5.13=−0.17<+$C_P$

Δ$P_{HG\ min}$=$P_{HG\ mm}$−$P_{HG-C9698}$=4.59−5.13=−0.54>−$C_P$

Once constraint is not held.

2.2.3.4 Search for the Worst Case Constraint

In this case, a single constraint is not held with the parameter (HG-LG)min and the variable CONSTRAINT is the difference (HG-LG).

2.2.3.5 Determination of the Ending Channel CstopN

We must have:
C9662<Cstop$_N$<C9687

To determine this, we are going to use a linear extrapolation. The law is y=a*x+b. The "x" coordinates are represented by the channels (here C9662 and C9687) and the "y" coordinates by the parameters responsible for the constraint that is held (here, the values of (HG-LG)).

The coefficients "a" and "b" are determined:

a=((HG-LG)$_{C9687}$−(HG-LG)$_{C9662}$)/(C9687−C9662)

a=(−0.32−(−0.77))/(9687−9662)

a=0.018 b=(HG-LG)$_{C9687}$−a*C9687 b=−0.32−0.018*9687 b=−174.686

Where:

y=0.018*x−174.686

Yet, the channel STOP is the one for which we have:

y=(HG-LG)min+$C_Δ$=−1.01+0.5=−0.51

The associated channel is deduced from this:

x=(y−(−174.686))/0.018 x=(−0.51+174.686)/0.018 x=9676.444

The channel STOP is therefore:
Cstop$_N$=ROUNDED (x)
Cstop$_N$=C9676
The first subband is therefore defined as follows:
BW1=(C9612, C9676, Ccal)

2.2.3.6 Determination of the Calibration Channel Ccal$_N$

The calibration channel is the one for which we have:

(HG-LG)$_{Ccal\ N}$=(HG-LG)min+$C_Δ$/2=−1.01+0.25=−0.76 dB

Yet, (HG-LG)$_{C9662}$<(HG-LG)$_{Ccal\ N}$<(HG-LG)$_{C9687}$

Therefore, the two consecutive channels ($C_i$ and $C_{i-1}$) of the initial table are:
$C_{i-1}$=C9662 and
$C_i$=C9687
We then use a linear extrapolation with law: y=a*x+b.
The "x" coordinates are represented by the channels (C9662 and C9687) and the "y" coordinates by the parameters responsible for the constraint that is held (here, the values of (HG-LG)).
In our case, the linear law will be the same as that in the preceding paragraph since it is obtained with the same channels C9662 and C9687.
Therefore, the channel is deduced from this:

x=(y−(−174.686))/0.018("y" shows(HG-LG)$_{Ccal}$ and "x" the channels)

x=(−0.76+174.686)/0.018 x=9662.555

The calibration channel is therefore:
Ccal$_N$=ROUNDED (x)
Ccal$_N$=C9662
We then obtain the triplet corresponding to the first subband:
BW1=(Cstart, Cstop, Ccal)=(C9612, C9676, C9662)

2.2.3.7 Determination of the Parameters $Cstart_{N+1}$, $P_{HG-CstartN+1}$, $(HG-LG)_{CstartN+}$ 2.2.3.7.1 Calculation of $Cstart_{N+1}$:

The channel START of the new subband follows the channel STOP of the preceding subband.
Where:

$$C_{start\,N+1} = C_{stop\,N} + 1 = C9676 + 1 = C9677$$

2.2.3.7.2 Calculation of $P_{HG-Cstart\,N+1}$:
We have:

$$P_{HG-C9662} < P_{HG-Cstart\,N+1} < P_{HG-C9687}$$

To determine this, we are going to use a linear extrapolation. The law is $y = a*x + b$. The "x" coordinates are represented by the channels (here C9662 and C9687) and the "y" coordinates by the associated high gain powers ($P_{HG-C9662}$ and $P_{HG-C9687}$).

The coefficients "a" and "b" are determined:

$$a = (P_{HG-C9687}\text{ and }P_{HG-C9662})/(9687-9662)$$

$$a = (5.13 - 4.96)/(9687 - 9662)$$

$$a = 0.0068$$

$$b = P_{HG-C9687} - a*9687$$

$$b = 5.13 - 0.0068*9687$$

$$b = -60.7416$$

Where:

$$y = 0.0068*x - 60.7416$$

The high gain power on this channel START are thus deduced from this:

$$P_{HG-Cstart\,N+1} = a*Cstart_{N+1} + b$$

$$P_{HG-Cstart\,N+1} = 0.0068*Cstart_{N+1} - 60.7416$$

$$P_{HG-Cstart\,N+1} = 0.0068*9677 - 60.7416$$

$$P_{HG-Cstart\,N+1} = 5.062\text{ dBm}$$

2.2.3.7.3 Calculation of $(HG-LG)_{Cstart\,N+1}$:
We have:

$$(HG-LG)_{C9662} < (HG-LG)_{Cstart\,N+1} < (HG-LG)_{C9687}$$

Therefore, the linear law that we use in order to determine this parameter is the same as that used in the preceding subband. Thus, we obtain:

$$(HG-LG)_{Cstart\,N+1} = 0.018*Cstart_{N+1} - 174.686$$

$$(HG-LG)_{Cstart\,N+1} = 0.018*9677 - 174.686$$

$$(HG-LG)_{Cstart\,N+1} = -0.5\text{ dB}$$

The following is therefore obtained for the second subband:
(Cstart, $P_{HG-Cstart}$, $HG-LG_{Cstart}$) = (C9677, 5.062, −0.5)

2.2.3.7.4 Updating
$C_{CountFreq} = C9677$
$(HG-LG)_{CCountFreq} = -0.5$ dB
$P_{HG\,CCountFreq} = 5.062$ dBm
$(HG-LG)min = (HG-LG)max = (HG-LG)_{Cstart\,N+1} = (HG-LG)_{C9677} = -0.5$ dB
$P_{HG\,min} = P_{HG\,max} = P_{HG\,Cstart\,N+1} = P_{HG\,C9677} = 5.062$ dBm Although the present disclosure has been described with reference to one or more examples, workers skilled in the art will recognize that changes may be made in form and detail without departing from the scope of the disclosure and/or the appended claims.

The invention claimed is:

1. A method for obtaining at least one calibration frequency for calibrating a transmission chain that can transmit information signals on a frequency band comprising a plurality of channels, said chain including an amplifier able to be configured according to at least one gain configuration, the method comprising:
   a) for each channel and each gain configuration, obtaining an output power value of the amplifier;
   b) obtaining at least one frequency dispersion, based on said power values;
   c) for each frequency dispersion obtained, detecting whether a constraint associated to said frequency dispersion is satisfied; and
   if the constraint is not satisfied, then the following steps are carried out:
   d) obtaining a current frequency subband; and
   e) obtaining a calibration frequency for said current frequency subband.

2. The method according to claim 1, wherein the method comprises the following steps:
   i) selecting a current channel from among said plurality of channels;
   ii) for said current channel, implementing step b) of obtaining at least one frequency dispersion;
   iii) for said current channel, implementing step c) of detecting;
   if the constraint is not satisfied, then carrying out steps d) and e) of obtaining a current frequency subband and a calibration frequency; and
   iv) selecting a following channel from among said plurality of channels, said following channel becoming the current channel before returning to the step ii).

3. The method according to claim 2, wherein step b) comprises a step of obtaining at least one first frequency dispersion equal to the difference between the output power value associated to said current channel and the output power value associated to said following channel.

4. The method according to claim 1, wherein the method comprises the following steps:
   searching among a plurality of constraints that are not satisfied to identify one which is the least best satisfied, called a worst case constraint, according to a determined comparison criterion;
   obtaining at least one selection variable, according to said worst case constraint.

5. The method according to claim 4, wherein said step d) of obtaining a current frequency subband comprises a step of determining an ending frequency for said current frequency subband, which comprises:
   obtaining, based on a first expression chosen from among a first plurality of expressions according to said at least one selection variable, of a first calculation variable;
   obtaining, on the basis of a first linear extrapolation, of at least one first coefficient; and
   calculating said ending frequency (Cstop), based on said first calculation variable and of said at least one first coefficient.

6. The method according to claim 4, wherein said step e) of obtaining a calibration frequency comprises the following steps:
- obtaining, on the basis of a second expression chosen from among a second plurality of expressions according to said at least one selection variable, of a second calculation variable;
- obtaining at least one calculation channel, by analysis of at least one constraint determined according to said at least one selection variable;
- obtaining, on the basis of a first linear extrapolation and of said at least one calculation channel, at least one second coefficient; and
- calculating said calibration frequency, on the basis of said second calculation variable and of said at least one second coefficient.

7. The method according to claim 1, wherein said step d) of obtaining a current frequency subband comprises a step of determining an ending frequency for said current frequency subband.

8. The method according to claim 1, wherein the method further comprises the following steps, for a following frequency subband:
- obtaining a starting frequency; and
- obtaining of at least one output power value of the amplifier associated to said starting frequency.

9. The method according to claim 1, wherein the amplifier is a double gain power amplifier, able to be configured according to first and second gain configurations.

10. The method according to claim 9, wherein step b) comprises a step of obtaining of at least one second frequency dispersion equal to the difference between:
- a first power difference equal to the difference between:
  - a first output power value associated to said first gain configuration and to said current channel; and
  - a second output power value associated to said second gain configuration and to said current channel; and
- a second power difference equal to the difference between:
  - a third output power value associated to said first gain configuration and to said following channel; and
  - a fourth output power value associated to said second gain configuration and to said following channel.

11. The method according to claim 1, wherein said transmission chain of information signals is a chain compliant with the UMTS standard.

12. A computer programme product recorded on a non-transitory storage device that can be read by a computer and/or that can be executed by a processor, said computer programme product comprising programme code instructions for execution of a method for obtaining at least one calibration frequency for calibrating a transmission chain that can transmit information signals on a frequency band comprising a plurality of channels, when said programme is executed on a computer, said chain including an amplifier able to be configured according to at least one gain configuration, the method comprising:
a) for each channel and each gain configuration, obtaining an output power value of the amplifier;
b) obtaining at least one frequency dispersion, based on said power values;
c) for each frequency dispersion obtained, detecting whether a constraint associated to said frequency dispersion is satisfied; and
if the constraint is not satisfied, then the following steps are carried out:
d) obtaining a current frequency subband; and
e) obtaining a calibration frequency for said current frequency subband.

13. A non-transitory storage device that can be read by a computer, storing a set of instructions that can be executed by said computer in order to implement a method for obtaining at least one calibration frequency for calibrating a transmission chain that can transmit information signals on a frequency band comprising a plurality of channels, said chain including an amplifier able to be configured according to at least one gain configuration, the method comprising:
a) for each channel and each gain configuration, obtaining an output power value of the amplifier;
b) obtaining at least one frequency dispersion, based on said power values;
c) for each frequency dispersion obtained, detecting whether a constraint associated to said frequency dispersion is satisfied; and
if the constraint is not satisfied, then the following steps are carried out:
d) obtaining a current frequency subband; and
e) obtaining a calibration frequency for said current frequency subband.

14. A device for obtaining at least one calibration frequency for calibrating a transmission chain able to transmit information signals on a frequency band comprising a plurality of channels, said chain including an amplifier of said information signals, said amplifier able to be configured according to at least one gain configuration, wherein said device comprises:
- means for obtaining at least one output power value of the amplifier;
- means for obtaining at least one frequency dispersion, based on the at least one power value;
- means for detecting whether at least one constraint linked to the at least one frequency dispersion is satisfied;
- means for obtaining a current frequency subband if the at least one constraint is not satisfied; and
- means for obtaining a calibration frequency for said current frequency subband if the at least one constraint is not satisfied.

* * * * *